Figure 1:
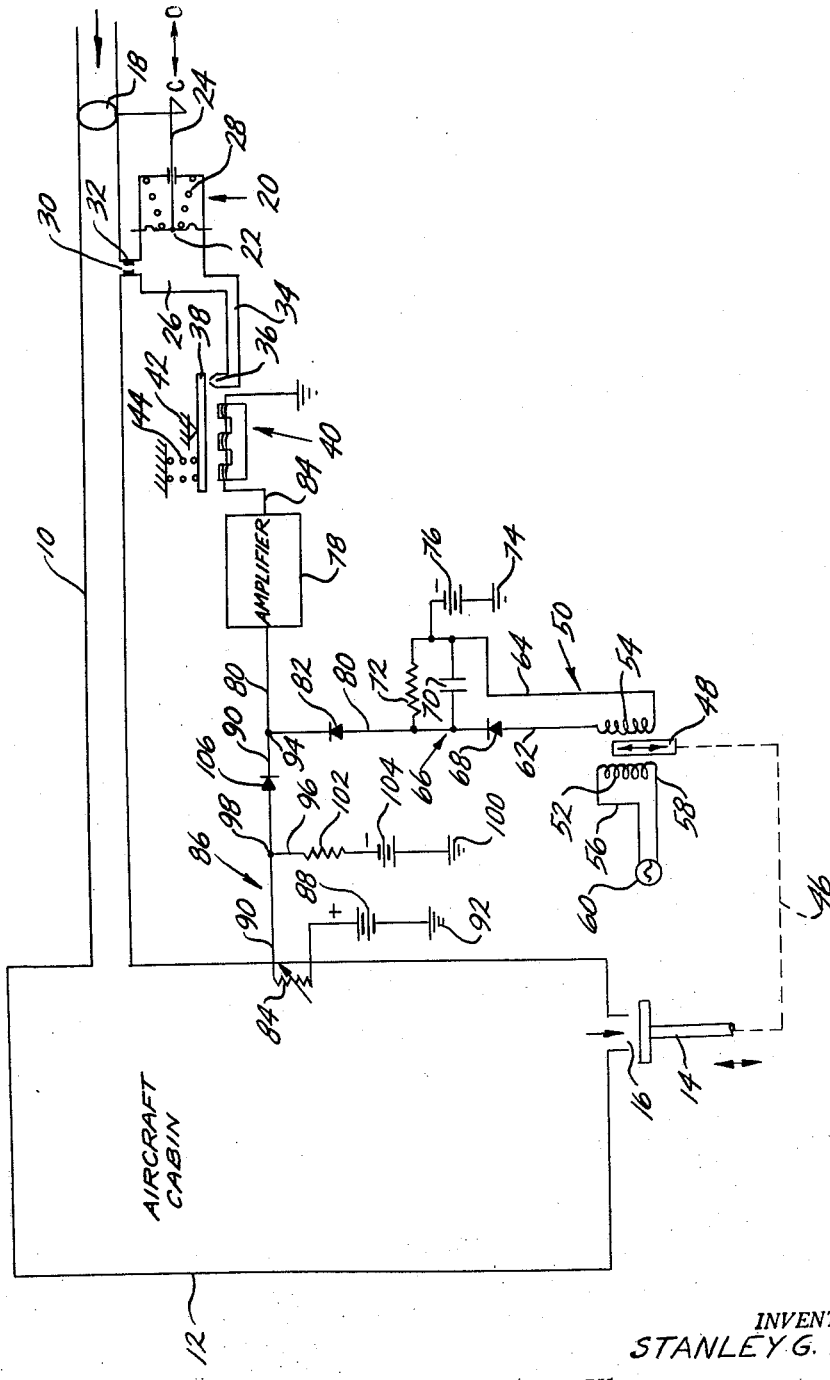

Feb. 26, 1963    S. G. BEST    3,078,778
FLOW CONTROL SYSTEM FOR PRESSURIZED
AIRCRAFT COMPARTMENT
Filed May 29, 1959

INVENTOR.
STANLEY G. BEST
BY
Teller & McCormick
ATTORNEYS

United States Patent Office 3,078,778
Patented Feb. 26, 1963

3,078,778
FLOW CONTROL SYSTEM FOR PRESSURIZED AIRCRAFT COMPARTMENT
Stanley G. Best, Manchester, Conn., assignor to United Aircraft Corporation, East Hartford, Conn., a corporation of Delaware
Filed May 29, 1959, Ser. No. 816,980
5 Claims. (Cl. 98—1.5)

This invention relates to air pressure and temperature conditioning systems for aircraft and, more particularly, to pressure and temperature conditioning systems of the type wherein an aircraft compartment requiring pressurization is supplied with an excess of pressurized air from a suitable supply conduit and an automatically operable discharge valve associated with the compartment varies the outflow of air therefrom whereby to regulate compartment air pressure in a desired manner.

In pressure and temperature conditioning systems of the type mentioned, there may be significant variations in the pressure of the air in the supply conduit for the compartment. In addition, the air flow requirements of the compartment requiring pressurization ordinarily vary over a substantial range depending on the desired pressure or schedule of pressures to be maintained in the compartment. In consequence, the compartment discharge valve is required to vary the outflow of air from the compartment over a comparatively wide range in order to maintain the desired pressure levels therein and the valve may operate for substantial periods of time at or near its full open position. Now, the large volumes of air flowing through the discharge valve during these periods of near open operation ordinarily serve no useful purpose other than the regulation of compartment pressure and represent wasted energy in the aircraft. That is, the pressurized air source serving the compartment supply conduit is subjected to air flow demands considerably higher than necessary for efficient compartment pressurization during such periods of valve operation. It will be readily apparent that these unnecessarily severe air flow demands are detrimental to overall aircraft performance in systems where the pressurized air source for the compartment supply conduit comprises the compressor section of a gas turbine engine utilized to propel the aircraft. While not so readily apparent, equally detrimental effects on aircraft performance are encountered in systems where pressurized air is supplied to the supply conduit by means other than the engine compressor section. It goes without saying that all instances of wasted energy represent significant penalties to overall aircraft performance in the design of modern ultra-high performance aircraft and are to be carefully avoided.

One object of the present invention is to provide in a pressure and temperature conditioning system of the type mentioned, a means for controlling air flow in the compartment supply conduit in keeping with the position of a discharge valve associated with said compartment whereby to avoid unnecessarily large air flows in said conduit and to minimize wasted energy in the aircraft.

Another object of the invention is to provide means for controlling air flow through the supply conduit for a pressure and temperature conditioned compartment in a system of the type mentioned, the said flow controlling means being operable responsive to temperature as well as to the position of a discharge valve associated with the compartment whereby the conduit air flow is varied as required to regulate temperature and to meet but not exceed the flow requirements for effective compartment pressurization.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single FIGURE of the drawing is a schematic illustration showing a portion of an exemplary air pressure and temperature conditioning system wherein the flow control means of the present invention is incorporated in a preferred form.

In the exemplary air pressure and temperature conditioning system shown, a supply conduit 10 serves a compartment 12 designated as the aircraft cabin. The conduit 10 may obviously serve other compartments or enclosures within the aircraft in place of, or in addition to, the cabin 12, but it has been shown connected with the cabin 12 alone for convenience of illustration. Air is introduced to the conduit 10 for delivery to the cabin 12 at its right-hand end and in the system shown, the said air is both pressure and temperature conditioned. As indicated above, however, the invention is not limited to systems wherein a compartment is both pressure and temperature conditioned and finds utility in systems where compartments are pressure conditioned only. The means supplying the pressure and temperature conditioned air to the conduit 10 form no part of the present invention and need not be shown or described herein.

Associated with the cabin 12 is a discharge valve means which is operable automatically to control the outflow of air from the cabin whereby to regulate cabin air pressure. There are several conventional types of discharge valves for regulating air pressure in aircraft compartments and there are a number of conventional types of pressure schedules for aircraft compartments. The present invention is not limited to pressure and/or temperature conditioning systems wherein any specific type of compartment pressure schedule or pressure regulating valve is employed, but has general utility in systems incorporating compartment pressure regulating valves of the general type which operate to regulate compartment pressure by controlling the outflow of air from the compartment. As will be described fully hereinbelow, the direct concern of the present invention with the compartment pressure regulating valve is limited to the position of the outflow varying element in the valve. Accordingly, it is necessary to provide only a general showing and description of a compartment pressure regulating valve in order that the invention may be fully understood.

In the drawing an outflow varying element or member 14 of a compartment pressure regulating valve is shown associated with a discharge port 16 in the cabin 12. The valve member 14 is shown as being movable linearly toward and away from the port 16 to vary the opening thereof and to thereby vary the outflow of air from the cabin 12. Operating means for the member 14, not shown, but which may take any well-known form, automatically effect movement of said member toward and away from the discharge port 16 as required to vary the outflow of air from the cabin 12 so that the cabin pressure is regulated in a desired manner.

It will be apparent that the valve member 14 will occupy a plurality of discrete positions with respect to the port 16 in the course of its operation in varying the cabin outflow and pressure. It will be further apparent that movement of said valve member to a plurality of discrete positions will occur irrespective of the type of operating means associated therewith and the manner in which cabin pressure is regulated thereby. There will be certain conditions of operation wherein the valve member 14 will be required to reside at or near its full open position in order to discharge sufficient air from the cabin to maintain a desired pressure level therein. During these conditions of operation, excessive demands are made on the engine compressor or other means supplying pressurized air to the supply conduit 10 and a substantial amount of energy is wasted in the aircraft as mentioned previously. There will also be conditions of operation wherein the valve member 14 will reside at various intermediate and partially open positions and it will be observed that in each said intermediate position of the valve member, the air flow therethrough and the demand on the engine compressor or other source is in excess of that required for cabin pressurization. It will also be observed that the amount of air flow in excess of requirements will vary in general with the position of the valve member 14, a comparatively large opening at the port 16 being indicative of air flow substantially in excess of the requirements for pressurization of the cabin and a comparatively small opening at said port indicating air flow which is only slightly in excess of that needed to meet the cabin pressurization requirements.

In accordance with the present invention, air flow through the cabin supply conduit 10 is controlled in accordance with the position of the valve member 14 relative to the cabin discharge port 16. More specifically, control of the air flow in the supply conduit is effected in such manner that the valve member 14 is maintained by its operating means in a preselected slightly open position with respect to the port 16. In this position of the valve member 14, a minimum of excess air flow is provided for and yet assurance is given of the satisfaction of the air flow requirements for effective cabin pressurization. That is, when the valve member 14 is in a slightly open position, it is known that there is sufficient air flow in the conduit 10 for maintaining the desired cabin pressure. If the air flow were not sufficient for this purpose, the valve member would be moved by its operating means to its fully closed position in an attempt to increase cabin pressure.

The means for controlling flow in the cabin supply conduit 10 in the manner described may take various forms within the scope of the invention. Generally speaking, the said flow control means comprises a means for varying flow in the said conduit in combination with a suitable control means therefor. The control means includes a sensing means for ascertaining the position of the valve member 14, or a similar pressure regulating valve element or means, and automatically operable means responsive to said sensing means. Said automatically operable means is adapted to cause the flow varying means to increase and decrease the supply conduit air flow respectively in response to closing and opening movements of the valve member 14 relative to the aforesaid preselected slightly open position thereof whereby to maintain said member at said preselected position.

In the embodiment of the invention shown, a valve 18, adjustable between open and closed positions in the supply conduit 10, serves as a means for varying air flow therethrough. A pressure responsive valve actuator, indicated generally at 20, comprises a diaphragm-piston device 22 connected by a suitable linkage 24 with the valve 18. The diaphragm-piston device 22 is urged in one direction by pressurized air in a control chamber 26 and in an opposite direction by a biasing spring 28 whereby to move the valve 18 in one and an opposite direction in the conduit 10 and to vary air flow therethrough. For purposes of illustration, it may be assumed that movement of the diaphragm-piston device 22 rightwardly in the drawing will cause the linkage 24 to move the valve 18 in the opening direction and that leftward movement of said device will result in valve movement in the closing direction.

The control chamber 26 in the valve actuator is connected with the conduit 10 for a supply of pressurized air by a conduit 30 provided with a restriction 32. On the side of the chamber 26 opposite the conduit 30 is a vent conduit 34. Disposed adjacent a vent orifice 36 at the free end of the conduit 34 is an armature 38 of a proportional solenoid indicated generally by the reference numeral 40. The solenoid armature 38 is adapted to be pivoted about a fulcrum 42 to vary the effective area of the vent orifice 36 and to thereby vary the control pressure in the actuator chamber 26 and the position of the valve 18. For purposes of illustration, it may be assumed that the proportional solenoid 40 will respond to a negative going voltage signal in such manner that the solenoid armature 38 will be pivoted about its fulcrum in a clockwise direction against the bias of an associated spring 44, which will decrease the effective area of the orifice 36, increase the pressure in the control chamber 26, and cause the valve 18 to be moved in the valve opening direction to increase air flow in the supply conduit 10. It may be similarly assumed that a positive going voltage signal will result in operation of the solenoid 40 and actuator 20 to move the valve 18 in the closing direction and decrease the flow of conditioned air to the cabin 12.

The proportional solenoid 40 is operated by electrical network means responsive to the position of the valve member 14 and it is also operated responsive to temperature sensitive means in the embodiment of the invention shown in the drawing. However, only the aforementioned means for sensing the position of the valve member 14 and the portion of the electrical network means relating thereto will be considered at present.

In the drawing the valve member 14 is shown as being connected by a broken line 46 with a slug 48 forming a part of a motion or position to voltage transducer indicated generally by the reference numeral 50. The broken line 46 designates a connection between the valve member 14 and the slug 48 whereby the latter is moved by and in unison with the former. In addition to the slug 48, the transducer 50 comprises first and second or input and output coils 52 and 54 which are shown arranged on opposite sides of the slug 48 and which are inductively coupled through the said slug. The first or input coil 52 is connected by conductors 56 and 58 with an alternating current power source 60 and conductors 62 and 64 lead from the second or output coil 54 to a conventional type of rectifying and filtering network indicated generally at 66. The rectifying and filtering network comprising a rectifier 68, a capacitor 70 and a resistor 72 is connected to ground at 74 through a negative polarity direct current power source comprising a battery 76. The battery 76 provides a reference voltage of negative polarity for the positive direct current output voltage of the rectifying and filtering network 66. The network 66 is connected also to an amplifier 78 by a conductor 80 through a rectifier 82. The rectifier 82 is connected in circuit with the network 66 and the amplifier 78 for a purpose which will be explained hereinafter with reference to the aforementioned temperature sensitive means and the portion of the electrical network means relating thereto.

From the foregoing, it will be apparent that the output side of the amplifier 78 may be connected to the proportional solenoid 40 as by a suitable conductor 84 to provide for operation of the said solenoid and the valve 18 under the control of the position sensing means or transducer 50 operated by the valve member 14. The alternating current output voltage of the transducer 50 to the rectifying and filtering network 66 will vary in proportion to the position of the slug 48 between the transducer coils 52 and 54 which coils are inductively coupled therethrough as stated. Thus, a direct current voltage which varies with the position of the valve member 14 and slug 48 will be provided at the input side of the amplifier 78. Due to the phase shift in the amplifier, the voltage signal to the proportional solenoid 40 will be proportional to the amplifier input voltage but of opposite polarity.

The solenoid 40, as mentioned previously, responds to a negative going voltage signal to cause opening movement of the valve 18 and to a positive going signal to cause closing movement of said valve. Thus, it will be seen that with the transducer 50 arranged to provide an increasing output voltage signal with closing movement of the valve member 14 and a decreasing voltage signal with valve opening movement, the amplifier 78 will receive positive and negative going voltage signals respectively with closing and opening movements of the valve member 14. The said signals will cause the proportional solenoid 40 to be operated respectively to move the valve 18 in opening and closing directions whereby to increase and decrease air flow in the supply conduit 10 and to cause the valve member 14 to be held substantially in a preselected slightly open position with respect to the port 16.

As previously mentioned, the flow control means is operable responsive to temperature sensitive means as well as discharge valve position sensitive means in the embodiment of the invention shown. Obviously, the said flow control means may be operable responsive to sensing means other than temperature sensitive means in addition to the valve position sensitive means. The flow control means may, for example, be operated to regulate cabin ventilation rather than cabin temperature and in such event flow rather than temperature might be sensed. In addition, it is to be noted that even where cabin temperature is regulated, the required regulation may be achieved by operating the flow control means in response to signals from sensing means other than temperature sensitive means.

When the flow control means of the invention is operable responsive to temperature sensitive means as well as valve position sensing means, the temperature sensitive or responsive means may take various forms and said means may have various locations. That is, the air flow in the supply conduit 10 may be varied for the purpose of controlling or regulating any of a number of temperature conditions which may be effected by such air flow. When, for example, other enclosures or compartments in the aircraft are served by the supply conduit, air flow may be controlled in said conduit in order to regulate the temperatures in said enclosures or compartments or in conduits associated therewith.

In the exemplary air pressure and temperature conditioning system shown, the conduit 10 is supplied with air which has been both temperature and pressure conditioned as stated. For purposes of illustration, it may be assumed that the cabin 12 requires air from its supply conduit for pressurization and cooling purposes only and that it is desired to maintain cabin temperature at a substantially constant level. It will be observed in the drawing that a temperature responsive or sensitive means is provided in the cabin 12. Said means comprises a thermistor 84 having a negative coefficient, i.e., the electrical resistance thereof is inversely proportional to the temperature felt thereby.

The thermistor 84 is connected in a conventional direct current bridge network indicated generally by the reference numeral 86. A direct current power source of positive polarity comprising a battery 88 is included in the bridge network and is conncted in circuit with the thermistor 84 in a conductor 90. The conductor 90 goes to ground at 92 and is connected with the previously mentioned conductor 80 at a point 94. The bridge network 86 also includes a conductor 96 which is connected with the conductor 90 at a point 98 and which has a ground connection 100. The conductor 96 has disposed therein a reference resistor 102 and a direct current power source of negative polarity comprising a battery 104. A rectifier 106 in the conductor 90 between the bridge network 86 and the point 94 has a function which will be described hereinbelow.

Consider now the operation of the bridge network 86 in relation to the amplifier 78, the proportional solenoid 40 and the valve 18 apart from the transducer 50 and the rectifying and filtering network 66. It will be seen that the output of the said bridge network in response to temperature in the cabin 12 which is in excess of the desired temperature level will be a positive going voltage in the conductor 90. Decreasing temperature in the cabin 12 will result in a negative going voltage in the said conductor. These voltage signals supplied to the amplifier 78 through the point 94 and the conductor 80 will respectively provide negative going and positive going voltage signals at the proportional solenoid 40. As explained previously, such voltage signals result respectively in opening and closing movements of the valve 18 and increasing and decreasing air flow in the conduit 10. Thus, it will be seen that the temperature within the aircraft cabin 12 may be maintained at a desired level determined by the reference resistor 102 by operation of the bridge network 86 in association with the amplifier 78, proportional solenoid 40, and the valve 18.

It will be apparent that in the combined operation of the valve 18 for temperature control within the cabin and for position control of the valve member 14, provision must be made for implementing the voltage signal calling for the largest flow of conditioned air through the conduit 10. That is, it is desired that the valve 18 operate under the control of the thermistor 84 when the air flow required for cooling the cabin is greater than the air flow which is required to maintain the valve member 14 in a slightly open position. When the air flow required to cool the cabin is insufficient for cabin pressurization, i.e., the voltage signal from the bridge network 86 calls for less flow than the voltage signal from the rectifying and filtering network 60, it is desired that the latter voltage signal be effective to control the position of the valve 18. The reasons dictating this mode of operation of the electrical network means of the invention should be readily apparent. If the bridge network 86 were allowed to effect closing movement of the valve 18 so as to reduce air flow in the conduit 10 to such an extent that the valve 14 were closed completely, the air flow would certainly be marginal and would most likely be inadequate for effective cabin pressurization. On the other hand, operation of the flow control means of the invention wherein the transducer 50 is permitted to control the position of the valve 18 so that insufficient air flow for cabin cooling is encountered is obviously unacceptable. Thus, it will be seen that the portion of the electrical network means comprising the transducer 50 and rectifying and filtering network 56 must operate in the nature of an overriding means or minimum flow device with respect to the bridge network 86 containing the thermistor 84.

The function of the rectifiers 82 and 106 in the electrical network means of the invention will now be readily understood. The said rectifiers serve to select the voltage signal from the bridge network 86 and the rectifying and filtering network 56 which calls for the greatest flow of conditioned air through the supply conduit 10. That is, the most positive of the voltage signals from the said bridge and rectifying and filtering networks will appear at the point 94 and will be supplied to the amplifier 78 for transmittal to the proportional solenoid 40. The provision of the most positive signal in the input side of the amplifier 78 results in the most negative voltage signal at the proportional solenoid 40 and in the largest opening of the valve 18 whereby the voltage signal calling for the largest amount of air flow in the conduit 10 is given effect.

The invention claimed is:

1. In an air conditioning and pressurizing system for an aircraft compartment which includes a supply conduit for the compartment connected with a source of temperature and pressure conditioned air and automatically operable discharge valve means associated with the compartment and movable between open and closed positions for controlling the outflow of air from the compartment and thus regulating compartment pressure, the combination of flow varying means in said supply conduit and control means therefor, the said control means comprising temperature responsive means affected by conditioned air metered by said flow varying means and which temperature responsive means produces a first output signal commanding one rate of flow through said supply conduit, sensing means for ascertaining the position of said discharge valve means and which sensing means produces a second output signal commanding another rate of flow through said supply conduit, means for selecting the one of said first and second signals which calls for the greater flow of air through said supply conduit, and means associated with said selecting means and with said flow varying means for operating said flow varying means in response to said one output signal.

2. In an air conditioning and pressurizing system for an aircraft compartment which includes a supply conduit for the compartment connected with a source of temperature and pressure conditioned air and automatically operable discharge valve means associated with the compartment and movable between open and closed positions for controlling the outflow of air from the compartment and thus regulating compartment pressure, the combination of a valve movable between open and closed positions in said supply conduit and control means therefor, the said control means comprising temperature responsive means affected by conditioned air metered by said supply conduit valve, sensing means for ascertaining the position of said discharge valve means, and means operable automatically responsive to said temperature responsive means and position sensitive means to adjust the position of said supply conduit valve so that air flow therethrough is varied as required to provide for a desired temperature condition at said temperature responsive means and at the same time limit closing movement of said discharge valve means at a preselected slightly open position thereof, said last mentioned automatically operable means serving to satisfy whichever of said temperature responsive and position sensitive means calls for the most open position of said supply conduit valve.

3. In an air conditioning and pressurizing system for an aircraft compartment which includes a supply conduit for the compartment connected with a source of temperature and pressure conditioned air and automatically operable discharge valve means associated with the compartment and movable between open and closed positions for controlling the outflow of air from the compartment and thus regulating compartment pressure, the combination of of a valve movable between open and closed positions in said supply conduit and control means therefor, the said control means comprising temperature responsive means in said compartment, sensing means for ascertaining the position of said discharge valve means, and means operable automatically responsive to said temperature responsive means and position sensitive means to adjust the position of said supply conduit valve so that air flow therethrough is varied as required to provide for a desired temperature condition in said compartment and at the same time limit closing movement of said discharge valve means at a preselected slightly open position thereof, said last mentioned automatically operable means serving to satisfy whichever of said temperature responsive and position sensitive means calls for the most open position of said supply conduit valve.

4. In an air conditioning and pressurizing system for an aircraft compartment which includes a supply conduit for the compartment connected with a source of temperature and pressure conditioned air and automatically operable discharge valve means associated with the compartment and movable between open and closed positions for controlling the outflow of air from the compartment and thus regulating compartment pressure, a valve movable between open and closed positions in said supply conduit for controlling flow therethrough, valve operating means adapted to be actuated electrically, temperature responsive means in said compartment, sensing means for ascertaining the position of said discharge valve means, and electrical network means connected with said valve operating means and said temperature responsive and position sensitive means and operable to actuate said valve operating means to adjust the position of said valve so that air flow therethrough is varied as required to provide for a desired temperature condition in said compartment and at the same time limit closing movement of said discharge valve means at a preselected slightly open position of the valve means, said last mentioned automatically operable means serving to satisfy whichever of said temperature responsive and position sensitive means calls for the most open position of said supply conduit valve.

5. In a system for cooling and pressurizing an aircraft compartment which includes a supply conduit for the compartment connected with a source of cooled and pressurized air and automatically operable discharge valve means associated with the compartment and movable between open and closed positions for controlling the outflow of air from the compartment and thus regulating compartment pressure, a valve movable between open and closed positions in said supply conduit for controlling flow therethrough, valve operating means adapted to be actuated electrically, temperature responsive means in said compartment, sensing means for ascertaining the position of said discharge valve means, and electrical network means connected with said valve operating means and said temperature responsive and position sensitive means, said network means being operable to actuate said valve operating means to open said valve for increased supply conduit air flow in response to signals from said temperature responsive and position sensitive means respectively indicating increasing air temperature in said compartment and closing movement of said discharge valve means relative to a preselected slightly open position of the valve means, and said network means being further operable to select the signal calling for the most open position of the supply conduit valve and to actuate said valve operating means so that the position of the valve is established in accordance therewith.

References Cited in the file of this patent
UNITED STATES PATENTS

| | | |
|---|---|---|
| 2,208,554 | Price | July 16, 1940 |
| 2,407,257 | Del Mar | Sept. 10, 1946 |
| 2,474,441 | Sparrow | June 28, 1949 |
| 2,479,991 | Wood | Aug. 23, 1949 |
| 2,539,430 | Jepson et al. | Jan. 30, 1951 |
| 2,562,918 | Hynes | Aug. 7, 1951 |